W. RENNARD.
MACHINE FOR MAKING STAPLES.

No. 185,405. Patented Dec. 19, 1876.

Witnesses
Grenville Lewis
M. Church

Inventor
W<sup>m</sup> Rennard
By Hill, Ellsworth & Spear
His Atty.

UNITED STATES PATENT OFFICE.

WILLIAM RENNARD, OF WHEELING, WEST VIRGINIA, ASSIGNOR OF ONE-HALF HIS RIGHT TO ARCHIBALD M. ADAMS, OF SAME PLACE.

IMPROVEMENT IN MACHINES FOR MAKING STAPLES.

Specification forming part of Letters Patent No. 185,405, dated December 19, 1876; application filed October 30, 1876.

*To all whom it may concern:*

Be it known that I, WILLIAM RENNARD, of Wheeling, in the county of Ohio and State of West Virginia, have invented a new and Improved Machine for Making Staples; and I do hereby declare the following to be a full, clear, and exact description of the same, reference being had to the accompanying drawings, forming part of this specification.

This invention relates to machines for making staples. The principle of operation and the particular construction of the machine are herein fully set forth, and made the subject of specific claims.

Figure 1:
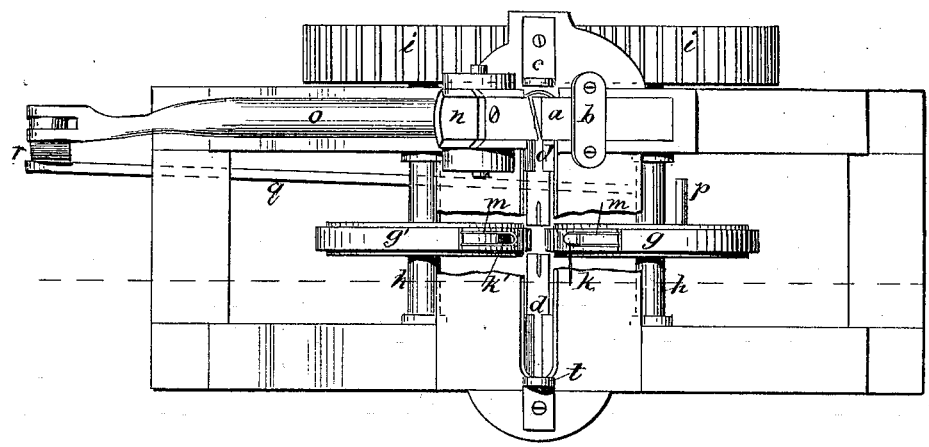
Figure 2:
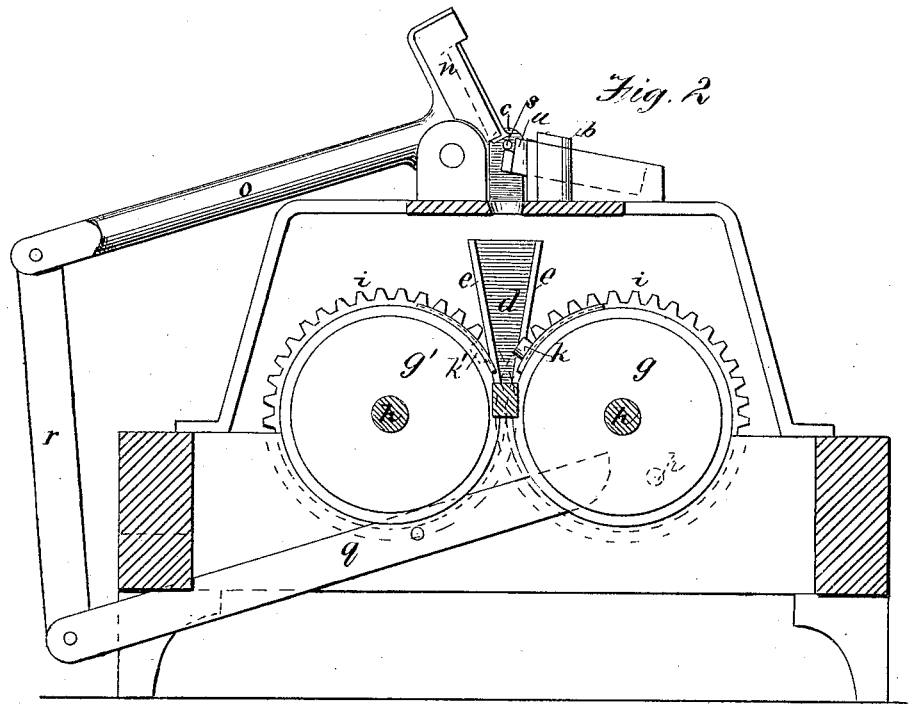

Figure 1 is a top view of the machine, with part broken away to disclose the working parts beneath. Fig. 2 is a vertical section showing the cutting apparatus, and a side view of the wheels which bend and form the staple.

The apparatus is mounted on suitable framework, as clearly represented.

The machine consists of two distinct parts, one relating to the cutting and the other to the bending of the wire which forms the staple. These parts, though to some extent independent in their operation, act in unison, as they are arranged upon my machine. The first-named part, consisting of the cutting apparatus, consists of a fixed and movable cutters. The former (marked $a$) is made so as to be adjustable forward, and may be removed, if desired. It rests in a recess, and is held down by a strap, $b$.

The fixed cutter is provided with a ledge, over which the wire or rod is passed, and the cutting-edge is inclined, as shown in Fig. 1. The edge of the movable cutter is made to correspond to that of the fixed cutter, so that in moving past the latter it shears the wire in a diagonal line, and leaves it with pointed ends.

The ledge over which the wire or rod is fed lies in direct line from the hole in the standard $c$, through which it advances to the box $d$, into which the piece falls when severed. This box is formed with inclined sides $e\ e$, and in a passage cut across the center of the box are two wheels, $g\ g'$, the peripheries of which are nearly in contact, the space between being arranged to receive the pieces of wire or rod as they drop. These wheels are fixed on shafts $h\ h$, on the outer ends of which are cogged wheels $i\ i$, by which motion may be imparted to the wheels from any suitable motor. On one of the wheels $g$ is fixed a strong stud, $k$, so arranged that when the wheel is rotated inwardly the stud shall strike across the bottom of the box, through the opening made transversely through the said box, and carry with it the wire or rod, which has been dropped from the cutting mechanism. The opposite wheel has in its periphery a socket, $k'$, fitted to receive the stud $k$. Around both the stud and the socket are grooves $m\ m$, of the form of the staple to be made. These grooves are, in portions of the peripheries of the wheels, slightly raised. The bottom of the box is formed of a strong beam, cut in the middle for the wheels and the passage of the stud, and near the wheels preferably grooved, these shallow grooves serving to steady and guide the rod when carried down by the wheels.

Referring to the movable knife, it will be observed that it is fastened in a block, $n$, which is pivoted in rear of the knife, and below it. This block is provided with a lever, $o$, extending rearward. The construction is such that the knife is the extremity of the short arm of the lever, and the elevation of the long arm brings the knife down diagonally over the wire. This lever $o$ is operated from a pin, $p$, in the side of one of the wheels through a lever, $q$, which is connected to the lever $o$ by a bar, $r$. The parts are so adjusted that the knives shall sever the rod, and allow the severed part to drop to the bottom of the box just before the stud on the wheel crosses the lower part thereof. The wire, as before stated, is introduced through a hole in the guide $s$, and its movement is limited by a stop, $t$, on the other end of the box.

The dies and the machine may be made to suit any size of rod, and may be driven by hand or steam power.

I claim as my invention—

1. An improved machine for making staples, consisting of the wheels $g\ g'$, provided with stud, socket, and grooves, in combination with the box $d$, and with the cutting apparatus located on one side thereof, the construction permitting the severed piece of wire or rod to drop into position where it may be received by the wheels, as set forth.

2. The combination of the box which receives the severed pieces, the guide $s$, the knives, and the stop $t$, as set forth.

3. The combination of the block $n$, carrying the moving knife, the levers $o$ and $q$, the connecting-rod $r$, and the pin on the wheel $g$, as set forth.

WILLIAM RENNARD.

Witnesses:
GRENVILLE LEWIS,
MELVILLE CHURCH.